United States Patent
Lai

(10) Patent No.: US 9,141,236 B2
(45) Date of Patent: Sep. 22, 2015

(54) LAYOUT STRUCTURE OF CAPACITIVE TOUCH PANEL

(75) Inventor: Chih-Chang Lai, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 237 days.

(21) Appl. No.: 13/434,878

(22) Filed: Mar. 30, 2012

(65) Prior Publication Data

US 2012/0262414 A1    Oct. 18, 2012

(30) Foreign Application Priority Data

Apr. 18, 2011  (TW) ............... 100113395 A

(51) Int. Cl.
*G06F 3/045*    (2006.01)
*G06F 3/044*    (2006.01)

(52) U.S. Cl.
CPC .................................... *G06F 3/044* (2013.01)

(58) Field of Classification Search
CPC ........... G06F 2203/04111; G06F 2203/04112; G06F 3/044; G06F 3/045; G06F 3/0412
USPC .......................................... 345/174; 200/600
See application file for complete search history.

(56) References Cited

U.S. PATENT DOCUMENTS

| | | | | |
|---|---|---|---|---|
| 2006/0097991 | A1* | 5/2006 | Hotelling et al. | 345/173 |
| 2007/0062739 | A1* | 3/2007 | Philipp et al. | 178/18.06 |
| 2008/0142352 | A1* | 6/2008 | Wright | 200/600 |
| 2008/0277259 | A1* | 11/2008 | Chang | 200/600 |
| 2011/0115718 | A1* | 5/2011 | Hsieh et al. | 345/173 |

FOREIGN PATENT DOCUMENTS

| | | |
|---|---|---|
| CN | 101819483 | 9/2010 |
| TW | 200712998 | 4/2007 |
| TW | 201044241 | 12/2010 |

OTHER PUBLICATIONS

"Office Action of Taiwan Counterpart Application", issued on Oct. 21, 2013, p. 1-p. 7.

* cited by examiner

*Primary Examiner* — Towfiq Elahi
(74) *Attorney, Agent, or Firm* — Jianq Chyun IP Office

(57) ABSTRACT

A layout structure of a capacitive touch panel is provided. The layout structure includes a plurality of electrical paths and a plurality of touch units. The touch units respectively include at least a receiving electrode and at least a driving electrode insulated from the receiving electrode. The receiving electrodes and the driving electrodes are disposed in the same conducting layer. The receiving electrodes are connected to a controller via different electrical paths. The driving electrodes electrically are connected to each other.

27 Claims, 4 Drawing Sheets

LAYOUT STRUCTURE OF CAPACITIVE TOUCH PANEL

CROSS-REFERENCE TO RELATED APPLICATION

This application claims the priority benefit of Taiwan application serial no. 100113395, filed on Apr. 18, 2011. The entirety of the above-mentioned patent application is hereby incorporated by reference herein and made a part of this specification.

BACKGROUND

1. Field of the Invention

The invention relates to a touch panel. Particularly, the invention relates to a layout structure of a capacitive touch panel.

2. Description of Related Art

A layout structure of a conventional mutual capacitance touch panel is generally a double conducting layer structure. Driving electrodes are disposed in one conducting layer of the double conducting layer, and receiving electrodes are disposed in another conducting layer of the double conducting layer. Therefore, the double conducting layer structure of the conventional mutual capacitance touch panel has higher cost due to configuration of the double conducting layer.

SUMMARY OF THE INVENTION

The invention is directed to a layout structure of a capacitive touch panel, which is implemented in a single conducting layer to reduce cost.

The invention provides a layout structure of a capacitive touch panel. The layout structure includes a plurality of electrical paths and a plurality of first touch units. The electrical paths are configured on a substrate. The first touch units respectively include at least a first receiving electrode and at least a first driving electrode insulated from the first receiving electrode. The first receiving electrodes and the first driving electrodes are disposed in a same conducting layer. The first receiving electrodes are insulated from each other. The first receiving electrodes are respectively connected to a controller through different electrical paths. The first driving electrodes are electrically connected to each other.

In an embodiment of the invention, in one of the first touch units, the controller simultaneously drives the first driving electrode and senses the first receiving electrode, so as to sense a capacitance corresponding to a position where the first touch unit is located in the capacitive touch panel.

In an embodiment of the invention, in one of the first touch units, the first receiving electrode is disposed in the first touch unit in a plus sign shape, an asterisk shape, a *-shape or a swastika shape, and the first driving electrode is disposed around the first receiving electrode.

According to the above descriptions, in the layout structure of a capacitive touch panel of the invention, the driving electrodes and the receiving electrodes can be disposed in the same conducting layer. Therefore, compared to the conventional mutual capacitance touch panel, the layout structure of the invention can simplify the number of masks and processing complexity, so as to reduce fabrication cost.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
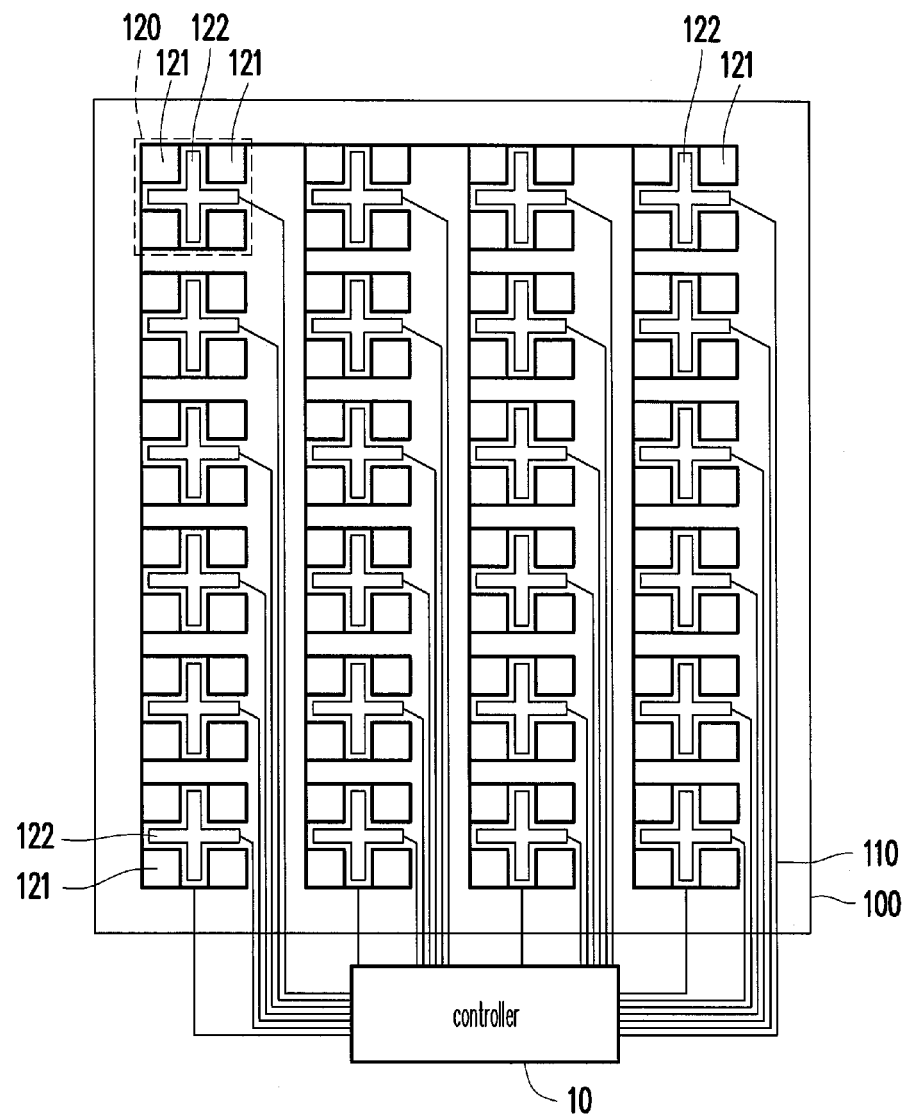
FIG. 1 is a schematic diagram of a layout structure of a capacitive touch panel according to an embodiment of the invention.

FIG. 1 is a schematic diagram of a layout structure of a capacitive touch panel 100 according to an embodiment of the invention. The layout structure of the capacitive touch panel 100 includes a plurality of electrical paths 110 and a plurality of first touch units (for example, a touch unit 120 shown in FIG. 1). Implementations of the other first touch units in the capacitive touch panel 100 are similar to that of the touch unit 120. In the present embodiment, a material of the substrate can be a transparent material such as polycarbonate (PC), polyethylene (PE), polyethylene terephthalate (PET), polymethyl methacrylate (PMMA) or glass, etc. A material of the electrical paths 110 and the first touch units 120 can be any transparent conductive material, for example, indium-tin oxide (ITO), etc.

Each of the first touch units 120 is divided into two regions, which are respectively a first driving electrode 121 and a first receiving electrode 122 insulated from the first driving electrode 121. The first receiving electrodes 122 and the first driving electrodes 121 are disposed in a same conducting layer. The first receiving electrodes 122 are insulated from each other. In each touch unit of the first touch units 120, the first receiving electrode 122 is disposed at a central portion of the touch unit, and the first driving electrode 121 is disposed around the first receiving electrode 122. In the present embodiment, the first receiving electrode 122 is disposed in the first touch unit 120 in a plus sign shape, and the first driving electrode 121 is disposed around the first receiving electrode 122 as that shown in FIG. 1. The first driving electrodes 121 are electrically connected to each other in a column direction. The first driving electrodes 121 at the front end of each column are electrically connected to each other, so that all of the first driving electrodes 121 are electrically connected to each other. The electrically connected first driving electrodes 121 are connected to a controller 10 (for example, a touch controller). Namely, the first driving electrodes 121 are equivalent to be electrically connected to the controller 10 through a same electrical path 110.

The first receiving electrodes 122 are respectively connected to the controller 10 through different electrical paths 110. In the capacitive touch panel 100, all of the electrical paths 110 between the first receiving electrodes 122 and the controller 10 and all of the electrical paths 110 between the first driving electrodes 121 and the controller 10 are all disposed in the same conducting layer.

The controller 10 can be disposed on the substrate of the capacitive touch panel 100 through a chip on glass (COG) process, or can be disposed on a flexible printed circuit (FPC) through a chip on film (COF) process, or disposed on a printed circuit board (PCB) through a chip on board (COB) process.

When the first touch units 120 of the capacitive touch panel 100 are sensed, the controller 10 outputs a driving voltage to drive all of the first driving electrodes 121, and meanwhile senses all of the first receiving electrodes 122 to sense capacitances corresponding to positions where the touch units 120 are located in the capacitive touch panel 100. Therefore, the controller 10 detects a capacitance variation of the first driving electrode 121 and the first receiving electrode 122 in each of the independent touch units 120. If the capacitances exceed a predetermined finger on threshold level, a peak position is found from the capacitances of the first touch units 120, and the corresponding capacitance is interpolated with the capacitances of the adjacent touch units 120 around the peak position to obtain detailed coordinates, so as to calculate the coordinates of a touch point.

In the embodiment of FIG. 1, the capacitive touch panel 100 having 4×6 first touch units 120 is illustrated. According to a design requirement, the controller 10 can simultaneously detect the capacitances of the 4×6 first touch units 120. In other embodiments, the controller 10 can simultaneously detect the capacitances of 6 first touch units 120 to reduce the cost of the controller 10. Since the controller 10 can only simultaneously detect the capacitances of 6 first touch units 120, the controller 10 may perform the detecting operation four times to detect the capacitances of all of the first touch units 120 on the capacitive touch panel 100.

Figure 2:
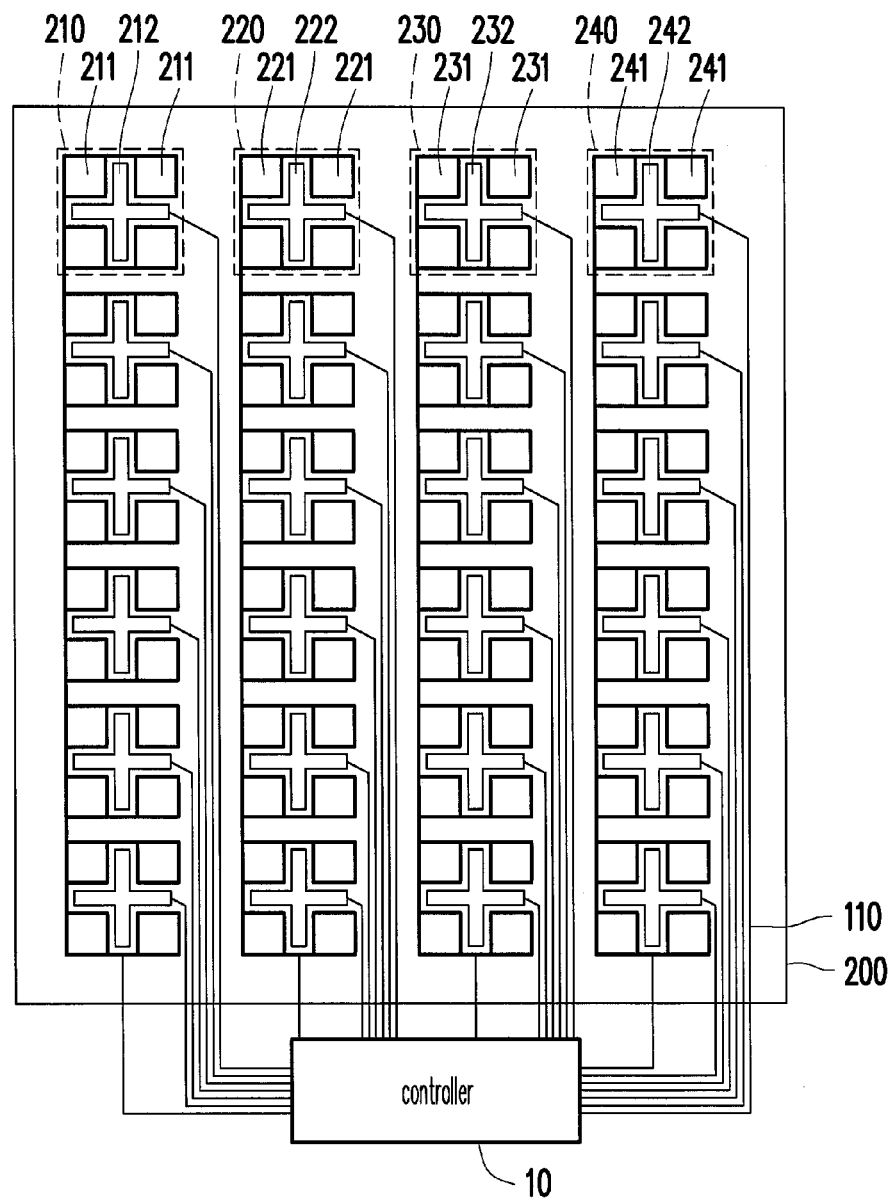
FIG. 2 is a schematic diagram of a layout structure of a capacitive touch panel according to another embodiment of the invention.

FIG. 2 is a schematic diagram of a layout structure of a capacitive touch panel 200 according to another embodiment of the invention. Implementation details of FIG. 2 are similar to that of FIG. 1. Referring to FIG. 2, the layout structure of the capacitive touch panel 200 includes the electrical paths 110, a plurality of first touch units (for example, touch units 210), a plurality of second touch units (for example, touch units 220), a plurality of third touch units (for example, touch units 230) and a plurality of fourth touch units (for example, touch units 240). The first touch units 210 are disposed in a first column of a 4×6 touch unit array, the second touch units 220 are disposed in a second column of the 4×6 touch unit array, the third touch units 230 are disposed in a third column of the 4×6 touch unit array, and the fourth touch units 240 are disposed in a fourth column of the 4×6 touch unit array.

The receiving electrodes and the driving electrodes of the touch units 210, 220, 230 and 240 and the electrical paths 110 are all disposed in the same conducting layer. Implementations of the touch units 210, 220, 230 and 240 are similar to that of the first touch unit 120 in the embodiment of FIG. 1. For example, the second touch units 220 respectively include at least a second receiving electrode 222 and at least a second driving electrode 221 insulated from the second receiving electrode 222. The second receiving electrodes 222 and the second driving electrodes 221 are all disposed in the same conducting layer, and the second receiving electrodes 222 are insulated from each other. The second receiving electrodes 222 are connected to the controller 10 through different electrical paths 110, and the second driving electrodes 221 are connected to the controller 10 through a same electrical path 110 as that shown in FIG. 2. Geometric shapes of receiving electrodes of the touch units 210, 220, 230 and 240 can be the same.

Different to the capacitive touch panel 100 of FIG. 1, in the 4×6 touch unit array of the capacitive touch panel 200, the driving electrodes of different columns are not connected. Namely, the driving electrodes of different columns are connected to the controller 10 through different electrical paths 110. Therefore, in the present embodiment, the controller 10 can scan the driving electrodes of the touch units 210, 220, 230 and 240 in alternation at different times. For example, the controller 10 outputs a driving voltage during a time period t1 to drive the driving electrodes 211 of all of the first touch units 210, and meanwhile senses the receiving electrodes 212 of all of the first touch units 210 to sense capacitances corresponding to positions where the touch units 210 are located in the capacitive touch panel 200. Then, the controller outputs the driving voltage during a time period t2 to drive the driving electrodes 221 of all of the second touch units 220, and meanwhile senses the receiving electrodes 222 of all of the second touch units 220 to sense capacitances corresponding to positions where the second touch units 220 are located. Deduced by analogy, the controller 10 drives the driving electrodes 231 of all of the third touch units 230 and senses the receiving electrodes 232 of all of the third touch units 230 during a time period t3, and drives the driving electrodes 241 of all of the fourth touch units 240 and senses the receiving electrodes 242 of all of the fourth touch units 240 during a time period t4. In this way, the controller 10 can perform the detecting operation four times, and each detecting operation only detects the capacitances of 6 touch units, so as to detect the capacitances of all of the touch units 210, 220, 230 and 240 on the capacitive touch panel 200.

In the aforementioned embodiment, the first receiving electrode 122 with a plus sign shape is disposed at a central portion of the first touch unit 120, and the first driving electrode 121 with four quadrangular shapes is disposed around the first receiving electrode 122. By configuring the first driving electrodes 121 and the first receiving electrode 122 of different geometric shapes, sensing capability (sensitivity) of the capacitive touch panel can be improved. The layout structure of the driving electrodes and the receiving electrodes is not limited to that shown of FIG. 1. For example, in other embodiments, the receiving electrodes 122, 212, 222, 232 and 242 are disposed in the touch units in asterisk shapes or other geometric shapes.

Figure 3:
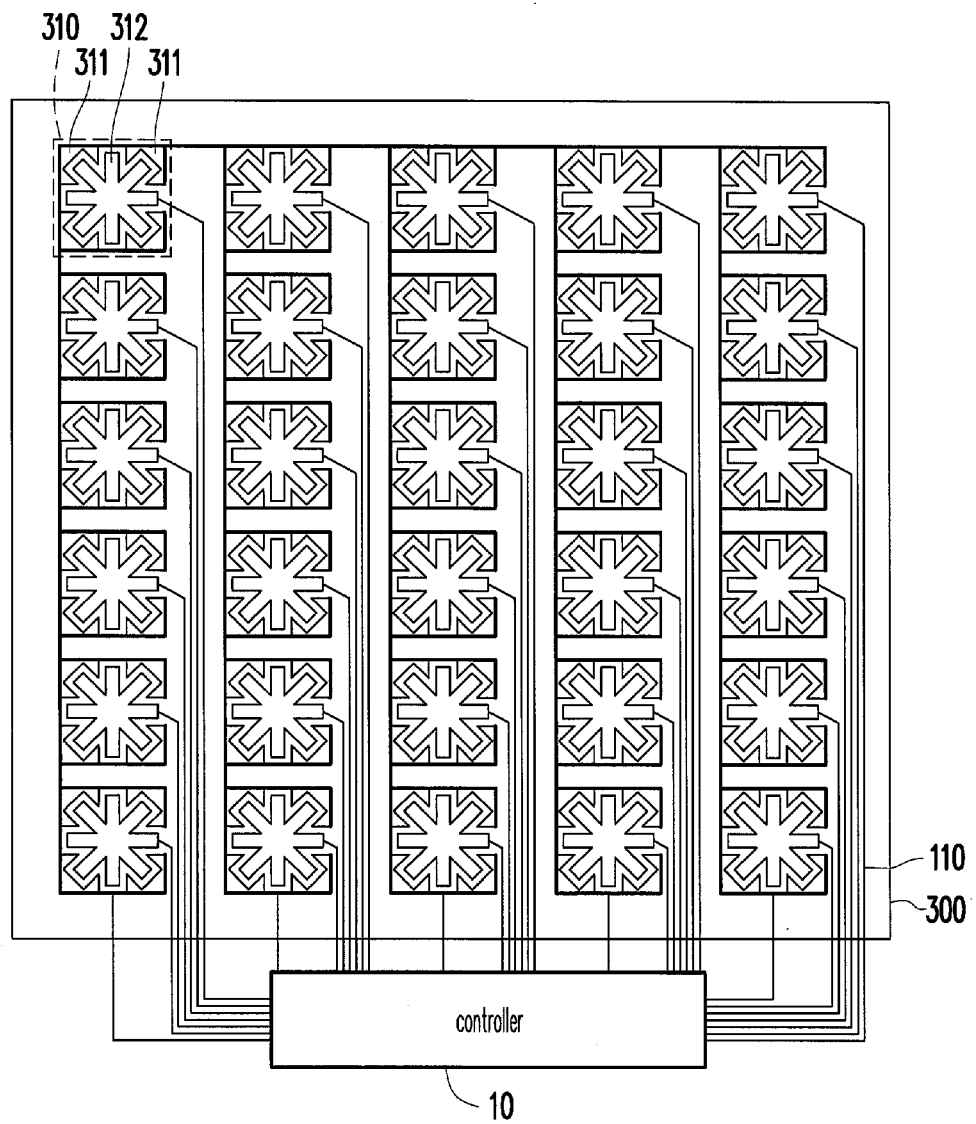
FIG. 3 is a schematic diagram of a layout structure of a capacitive touch panel according to still another embodiment of the invention.

FIG. 3 is a schematic diagram of a layout structure of a capacitive touch panel 300 according to still another embodiment of the invention. Implementation details of FIG. 3 are similar to that of FIG. 1. Referring to FIG. 3, the layout structure of the capacitive touch panel 300 includes the electrical paths 110 and 5×6 first touch units (for example, a touch unit 310). Implementations of the other touch units in the capacitive touch panel 300 are similar to that of the touch unit 310. Each of the first touch units 310 is divided into two regions, which are respectively a driving electrode 311 and a receiving electrode 312. The receiving electrodes 312 and the driving electrodes 311 are all disposed in a same conducting layer.

In the present embodiment, the first receiving electrode 312 is disposed in the touch unit 310 in a *-shape, and the first driving electrode 311 is disposed around the first receiving electrode 312, as that shown in FIG. 3. The driving electrodes 311 in the column direction are electrically connected to each other. The first driving electrodes 311 at the front end of each column are electrically connected, so that all of the first driving electrodes 311 are connected. The electrically connected first driving electrodes 311 are connected to the controller 10. Namely, the first driving electrodes 311 are electrically connected to the controller 10 through a same electrical path 110. The first receiving electrodes 312 are respectively connected to the controller 10 through different electrical paths 110. In the capacitive touch panel 300, all of the electrical paths 110 between the first receiving electrodes 312 and the controller 10 and all of the electrical paths 110 between the first driving electrodes 311 and the controller 10 are all disposed in the same conducting layer.

When the first touch units 310 of the capacitive touch panel 300 are sensed, the controller 10 outputs a driving voltage to drive all of the first driving electrodes 311, and meanwhile senses 5×6 first receiving electrodes 312 to sense capacitances corresponding to positions where the touch units 310 are located in the capacitive touch panel 300. Therefore, the controller 10 detects a capacitance variation of the first driving electrode 311 and the first receiving electrode 312 in each of the independent touch units 310. In other embodiments, the controller 10 can simultaneously detect the capacitances of 5 first touch units 310 to reduce the cost of the controller 10. Since the controller 10 can only simultaneously detect the capacitances of 5 first touch units 310, the controller 10 may perform the detecting operation six times to detect the capacitances of all of the first touch units 310 on the capacitive touch panel 300.

If capacitances of the first touch units 310 exceed a predetermined finger on threshold level, a peak position is found from the capacitances of the first touch units 310, and the corresponding capacitance is interpolated with the capacitances of the adjacent touch units 310 around the peak position to obtain detailed coordinates, so as to calculate the coordinates of a touch point.

Figure 4:
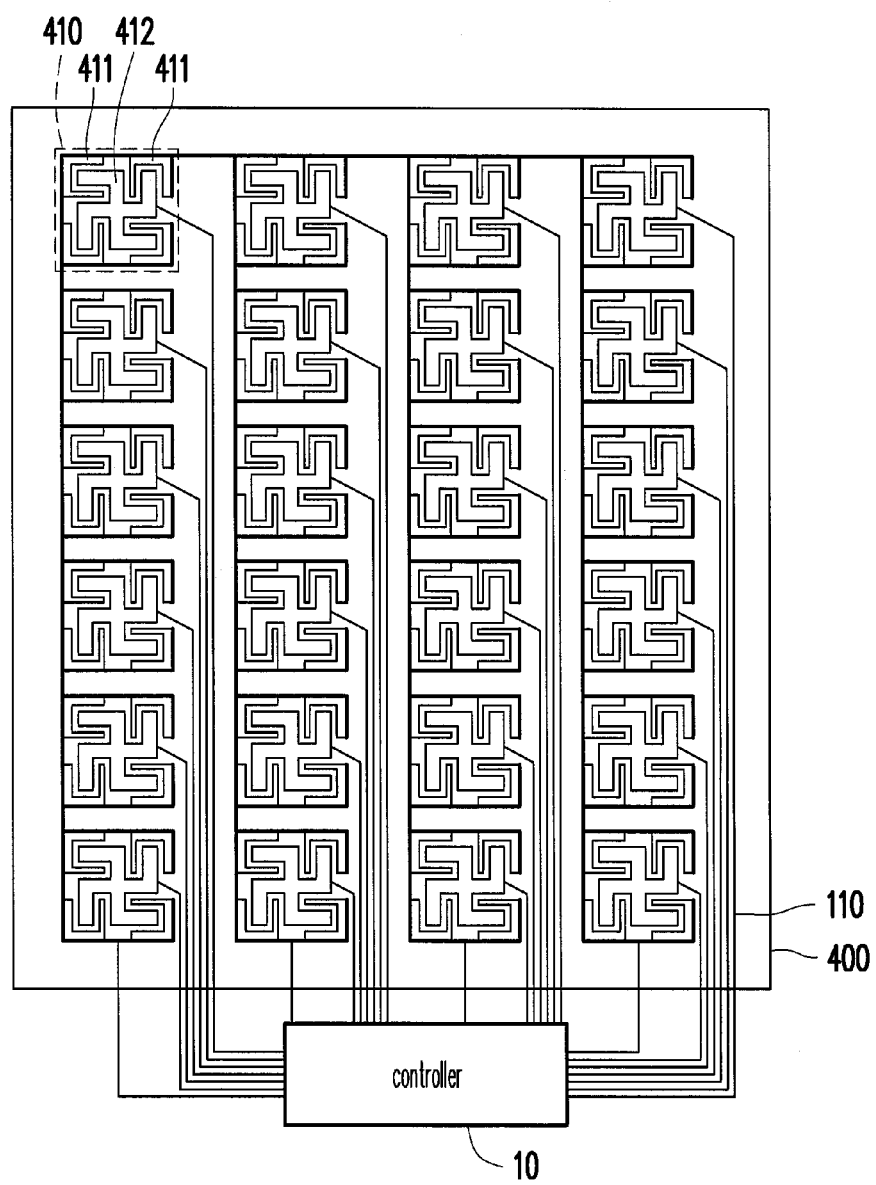
FIG. 4 is a schematic diagram of a layout structure of a capacitive touch panel according to yet another embodiment of the invention.

FIG. 4 is a schematic diagram of a layout structure of a capacitive touch panel 400 according to yet another embodiment of the invention. Implementation details of FIG. 4 are similar to that of FIG. 1. Referring to FIG. 4, the layout structure of the capacitive touch panel 400 includes the electrical paths 110 and 4×6 first touch units (for example, a touch unit 410). Implementations of the other touch units in the capacitive touch panel 400 are similar to that of the touch unit 410. Each of the first touch units 410 is divided into two regions, which are respectively a driving electrode 411 and a receiving electrode 412. The receiving electrodes 412 and the driving electrodes 411 are all disposed in a same conducting layer.

In the present embodiment, the first receiving electrode 412 is disposed in the touch unit 410 in a swastika shape, and the first driving electrode 411 is disposed around the first receiving electrode 412 in four "C" shapes, as that shown in FIG. 3. The driving electrodes 411 in the column direction are electrically connected to each other. All of the first driving electrodes 411 are connected. The electrically connected first driving electrodes 411 are connected to the controller 10. Namely, the first driving electrodes 411 are equivalent to be electrically connected to the controller 10 through a same electrical path 110. The first receiving electrodes 412 are respectively connected to the controller 10 through different electrical paths 110. In the capacitive touch panel 400, all of the electrical paths 110 between the first receiving electrodes 412 and the controller 10 and all of the electrical paths 110 between the first driving electrodes 411 and the controller 10 are all disposed in the same conducting layer.

When the first touch units 410 of the capacitive touch panel 400 are sensed, the controller 10 outputs a driving voltage to drive all of the first driving electrodes 411, and meanwhile senses 4×6 first receiving electrodes 412 to sense capacitances corresponding to positions where the touch units 410 are located in the capacitive touch panel 400. Therefore, the controller 10 detects a capacitance variation of the first driving electrode 411 and the first receiving electrode 412 in each of the independent touch units 410. In other embodiments, the controller 10 can simultaneously detect the capacitances of 4 first touch units 410 to reduce the cost of the controller 10. Since the controller 10 can only simultaneously detect the capacitances of 4 first touch units 410, the controller 10 may perform the detecting operation six times to detect the capacitances of all of the first touch units 410 on the capacitive touch panel 400.

In summary, in the layout structure of a capacitive touch panel of the invention, the driving electrodes and the receiving electrodes can be disposed in the same conducting layer. Therefore, compared to the conventional mutual capacitance touch panel, the layout structure of the invention can simplify the number of masks and processing complexity, so as to reduce fabrication cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A layout structure of a capacitive touch panel, comprising:
   a plurality of electrical paths, configured on a substrate; and
   a plurality of first touch units, respectively comprising at least one first receiving electrode and at least one first driving electrode, wherein all of receiving electrodes in the capacitive touch panel are respectively connected to a controller through different electrical paths, the first driving electrodes are electrically connected to each other, the first touch units are arranged in an m*n array, and both m and n are positive integers greater than or equal to two;
   wherein in one of the first touch units, a number of the at least one first receiving electrode is one and is disposed at a central portion of the first touch unit, the number of the at least one first driving electrode is greater than one and is disposed around the at least one first receiving electrode, and all of driving electrodes disposed around the at least one first receiving electrode are directly electrically connected to each other.

2. The layout structure of the capacitive touch panel as claimed in claim 1, wherein in one of the first touch units, the controller simultaneously drives the first driving electrode and senses the first receiving electrode, so as to sense a capacitance corresponding to a position where the first touch unit is located in the capacitive touch panel.

3. The layout structure of the capacitive touch panel as claimed in claim 1, wherein in the capacitive touch panel, the electrical paths between the first receiving electrodes and the controller and the electrical paths between the first driving electrodes and the controller are all disposed in a same conducting layer.

4. The layout structure of the capacitive touch panel as claimed in claim 1, further comprising:
   a plurality of second touch units, respectively comprising at least one second receiving electrode and at least one second driving electrode insulated from the second receiving electrode, and the second receiving electrodes and the second driving electrodes being disposed in a same conducting layer, wherein the second receiving electrodes are insulated from each other, the second receiving electrodes are respectively connected to the controller through different electrical paths, and the second driving electrodes are connected to the controller through a same electrical path of the electrical paths.

5. The layout structure of the capacitive touch panel as claimed in claim 4, wherein geometric shapes of the second receiving electrodes are the same to geometric shapes of the first receiving electrodes.

6. The layout structure of the capacitive touch panel as claimed in claim 1, wherein all of the first driving electrodes are electrically connected to each other.

7. The layout structure of the capacitive touch panel as claimed in claim 1, wherein in one of the first touch units, the at least one first receiving electrode is disposed in the first touch unit in an asterisk shape, and the at least one first driving electrode is disposed around the at least one first receiving electrode.

8. The layout structure of the capacitive touch panel as claimed in claim 1, wherein in one of the first touch units, the at least one first receiving electrode is disposed in the first touch unit in a *-shape, and the at least one first driving electrode is disposed around the at least one first receiving electrode.

9. The layout structure of the capacitive touch panel as claimed in claim 1, wherein in one of the first touch units, the at least one first receiving electrode is disposed in the first touch unit in an equilateral cross with its four arms bent at 90 degrees, and the at least one first driving electrode is disposed around the at least one first receiving electrode.

10. The layout structure of the capacitive touch panel as claimed in claim 1, wherein the driving electrodes of at least two of the first touch units are electrically connected to each other along a first direction, and the driving electrodes of the at least two of the first touch units are electrically connected to each other along a second direction.

11. The layout structure of the capacitive touch panel as claimed in claim 1, wherein the array along the first direction comprises m columns of the first touch units, and every two adjacent first driving electrodes of the first driving electrodes of n first touch units of the first touch units on a same column of the m columns are directly connected to each other and electrically connected to the controller through same one of the electrical paths.

12. The layout structure of the capacitive touch panel as claimed in claim 11, wherein the driving electrodes of every two adjacent first touch units in at least one of n rows of the first touch units are directly connected to each other.

13. The layout structure of the capacitive touch panel as claimed in claim 1, wherein in a same first touch unit of the first touch units, every two adjacent first driving electrodes of the first driving electrodes are directly connected to each other.

14. The layout structure of the capacitive touch panel as claimed in claim 1, wherein the at least one first receiving electrode of each of the first touch units is adjacent to the at least one first driving electrode of a same first touch unit of the first touch units along a plurality of intersecting directions.

15. The layout structure of the capacitive touch panel as claimed in claim 1, wherein in the first touch units, the first driving electrodes of a first plurality of the first touch units are directly connected to the first driving electrodes of two first touch units adjacent to the first plurality of the first touch units, and the first driving electrodes of a second plurality of the first touch units are directly connected to the controller and the first driving electrodes of the first touch units adjacent to the second plurality of the first touch units.

16. The layout structure of the capacitive touch panel as claimed in claim 12, wherein in a same first touch unit of the first touch units, the at least one first receiving electrode is disposed in the first touch unit in a plus sign shape, an asterisk shape, a *-shape, or in an equilateral cross with its four arms bent at 90 degrees.

17. The layout structure of the capacitive touch panel as claimed in claim 1, wherein the first receiving electrodes and the first driving electrodes are disposed in a same conducting layer on the substrate, and the first receiving electrodes are electrically insulated from the first driving electrodes.

18. A layout structure of a capacitive touch panel, comprising:
a plurality of electrical paths, configured on a substrate; and
a plurality of first touch units, respectively comprising at least one first receiving electrode and at least one first driving electrode, wherein the first receiving electrodes are respectively connected to a controller through different electrical paths, all of driving electrodes in the capacitive touch panel are electrically connected to each other, the first touch units are arranged in an m*n array, and both m and n are positive integers greater than or equal to two;
wherein in one of the first touch units, a number of the at least one first receiving electrode is one and is disposed at a central portion of the first touch unit, the number of the at least one first driving electrode is greater than one and is disposed around the at least one first receiving electrode, and all of driving electrodes disposed around the at least one first receiving electrode are directly electrically connected to each other.

19. A layout structure of a capacitive touch panel, comprising:
a plurality of electrical paths, configured on a substrate; and
a plurality of touch units, respectively comprising at least one receiving electrode and at least one driving electrode, wherein all of the receiving electrodes in the capacitive touch panel are not electrically connected to each other and are respectively connected to a controller through different electrical paths, the driving electrodes of the touch units are connected to each other and are then connected to the controller through at least one same electrical path of the electrical paths, the touch units are arranged in an m*n array, and both m and n are positive integers greater than or equal to two;
wherein in one of the touch units, a number of the at least one receiving electrode is one and is disposed at a central portion of the touch unit, the number of the at least one driving electrode is greater than one and is disposed around the at least one receiving electrode, and all of driving electrodes disposed around the at least one receiving electrode are directly electrically connected to each other.

20. The layout structure of the capacitive touch panel as claimed in claim 19, wherein the driving electrodes of at least two of the touch units are electrically connected to each other along a first direction, and the driving electrodes of the at least two of the touch units are electrically connected to each other along a second direction.

21. The layout structure of the capacitive touch panel as claimed in claim 19, wherein the at least one receiving electrode of each of the touch units is adjacent to the at least one driving electrode of a same touch unit of the touch units along a plurality of intersecting directions.

22. A layout structure of a capacitive touch panel, comprising:
a plurality of touch units, respectively comprising at least one receiving electrode and at least one driving electrode, wherein the at least one receiving electrode of each of the touch units is adjacent to the at least one driving electrode of a same touch unit of the touch units along a plurality of intersecting directions, the driving electrodes of at least two of the touch units are electrically connected to each other along a first direction, the driving electrodes of the at least two of the touch units are electrically connected to each other along a second direction, the touch units are arranged in an m*n array, and both m and n are positive integers greater than or equal to two;

wherein in one of the touch units, a number of the at least one receiving electrode is one and is disposed at a central portion of the touch unit, the number of the at least one driving electrode is greater than one and is disposed around the at least one receiving electrode, and all of driving electrodes disposed around the at least one receiving electrode are directly electrically connected to each other, wherein all of receiving electrodes in the capacitive touch panel are respectively connected to a controller through different electrical paths.

23. The layout structure of the capacitive touch panel as claimed in claim 22, wherein the receiving electrodes of at least some of the touch units are not electrically connected to each other and are respectively connected to a controller through different electrical paths.

24. The layout structure of the capacitive touch panel as claimed in claim 22, wherein the number of the touch units is X, the driving electrodes of the X touch units are connected to a controller through Y electrical paths, and Y<X.

25. A layout structure of a capacitive touch panel, comprising:
   a plurality of receiving electrodes; and
   a plurality of driving electrodes, wherein at least two of the driving electrodes are electrically connected to each other along a first direction, at least two of the driving electrodes are electrically connected to each other along a second direction, a plurality of touch units respectively comprises at least one of the receiving electrodes and at least one of the driving electrodes, the touch units are arranged in an m*n array, and both m and n are positive integers greater than or equal to two;
   wherein in one of the touch units, a number of the receiving electrode is one and is disposed at a central portion of the touch unit, the number of the driving electrode is greater than one and is disposed around the receiving electrode, and all of driving electrodes disposed around the receiving electrode are directly electrically connected to each other, wherein all of receiving electrodes in the capacitive touch panel are respectively connected to a controller through different electrical paths.

26. The layout structure of the capacitive touch panel as claimed in claim 25, wherein all of the receiving electrodes in the capacitive touch panel are not electrically connected to each other.

27. The layout structure of the capacitive touch panel as claimed in claim 25, wherein at least two of the receiving electrodes are not electrically connected to each other along both the first direction and the second direction.

* * * * *